US011041376B2

(12) United States Patent
Ledroz et al.

(10) Patent No.: US 11,041,376 B2
(45) Date of Patent: Jun. 22, 2021

(54) GYRO-MAGNETIC WELLBORE SURVEYING

(71) Applicant: Gyrodata, Incorporated, Houston, TX (US)

(72) Inventors: Adrián Guillermo Ledroz, Houston, TX (US); John Lionel Weston, Christchurch (GB)

(73) Assignee: Gyrodata, Incorporated, Houston, TX (US)

( * ) Notice: Subject to any disclaimer, the term of this patent is extended or adjusted under 35 U.S.C. 154(b) by 176 days.

(21) Appl. No.: 16/006,791

(22) Filed: Jun. 12, 2018

(65) Prior Publication Data

US 2018/0363445 A1     Dec. 20, 2018

Related U.S. Application Data

(63) Continuation-in-part of application No. 15/896,010, filed on Feb. 13, 2018.
(Continued)

(51) Int. Cl.
| | | |
|---|---|---|
| *E21B 47/00* | (2012.01) | |
| *G01V 3/38* | (2006.01) | |
| *G01V 9/00* | (2006.01) | |
| *G01V 3/40* | (2006.01) | |
| *G01V 1/28* | (2006.01) | |
| *G01V 3/26* | (2006.01) | |

(Continued)

(52) U.S. Cl.
CPC .............. *E21B 47/00* (2013.01); *G01V 1/282* (2013.01); *G01V 3/26* (2013.01); *G01V 3/38* (2013.01); *G01V 3/40* (2013.01); *G01V 9/00* (2013.01); *E21B 7/04* (2013.01); *E21B 47/022* (2013.01); *E21B 47/024* (2013.01)

(58) Field of Classification Search
None
See application file for complete search history.

(56) References Cited

U.S. PATENT DOCUMENTS 5,432,699 A * 7/1995 Hache ................... E21B 47/022
702/9
5,623,407 A   4/1997 Brooks
(Continued)

FOREIGN PATENT DOCUMENTS

WO     2014105503 A2     7/2014

OTHER PUBLICATIONS

Macmillan et al., "Confidence Limits Associated With Values of the Earth's Magnetic Field Used for Directional Drilling" Jun. 2010 SPE Drilling & Completion (Year: 2010).*
(Continued)

*Primary Examiner* — John C Kuan
(74) *Attorney, Agent, or Firm* — Pramudji Law Group PLLC; Ari Pramudji

(57) ABSTRACT

Various implementations described herein are directed to a method for surveying a wellbore. A statistical estimation process that combines magnetic survey measurement data and gyroscopic survey measurement data to form error estimates in a magnetic survey system is applied. The error estimates are used to correct magnetic survey data provided by the magnetic survey system. Magnetic only survey data is used when convergence of the error estimates has occurred. Information that facilitates drilling the wellbore is provided.

19 Claims, 8 Drawing Sheets

Related U.S. Application Data

(60) Provisional application No. 62/519,806, filed on Jun. 14, 2017.

(51) Int. Cl.
  *E21B 47/024* (2006.01)
  *E21B 47/022* (2012.01)
  *E21B 7/04* (2006.01)

(56) References Cited

U.S. PATENT DOCUMENTS

| | | | |
|---|---|---|---|
| 6,508,316 B2 | 1/2003 | Estes et al. | |
| 6,529,834 B1 | 3/2003 | Estes et al. | |
| 8,185,312 B2* | 5/2012 | Ekseth | E21B 7/067 |
| | | | 702/7 |
| 9,631,475 B2 | 4/2017 | Ledroz et al. | |
| 2001/0041963 A1 | 11/2001 | Estes et al. | |
| 2008/0156485 A1 | 7/2008 | Phillips et al. | |
| 2012/0245850 A1* | 9/2012 | Bang | G01C 25/005 |
| | | | 702/9 |
| 2013/0282290 A1 | 10/2013 | Weston et al. | |
| 2014/0102795 A1* | 4/2014 | VanSteenwyk | E21B 47/02216 |
| | | | 175/45 |
| 2014/0374159 A1* | 12/2014 | McElhinney | E21B 44/005 |
| | | | 175/45 |
| 2016/0201449 A1 | 7/2016 | Dirksen et al. | |
| 2018/0045033 A1 | 2/2018 | Jeffryes | |

OTHER PUBLICATIONS

PCT International Search Report and Written Opinion; PCT/US2018/037314; dated Sep. 11, 2018.

Weston, et al.; New Gyro While Drilling Technology Delivers Accurate Azimuth and Real-Time Quality for All Well Trajectories; SPE Drilling & Completion; Sep. 2014.

Ekseth, et al.; High-Integrity Wellbore Surveying; SPE Drilling & Completion; pp. 438-447; Dec. 2010.

Thorogood, et al; Surveying Techniques with a Solid State Magnetic Multishoot Device; SPE Drilling Engineering; Sep. 1990.

\* cited by examiner

GYRO-MAGNETIC WELLBORE SURVEYING

CROSS-REFERENCE TO RELATED APPLICATIONS

This application is a continuation-in-part of U.S. patent application Ser. No. 15/896,010, filed Feb. 13, 2018, which claims the benefit of U.S. Provisional Application No. 62/519,806, filed Jun. 14, 2017, both of which are incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

There are many sources of error in wellbore surveys. Gyroscopic sensors typically have internal sources of error that can affect gyroscopic wellbore surveys. Magnetic sensors typically have errors due to external influences that can affect the magnetic wellbore surveys. One example of an external source of error is how well the Earth's field is being modeled. Although gyroscopic sensors can at times be more accurate than magnetic sensors, gyroscopic surveys generally take longer to perform than magnetic surveys, thus affecting a rig time needed to construct a well.

SUMMARY

Described herein are various implementations of a method for surveying a wellbore. A statistical estimation process that combines magnetic survey measurement data and gyroscopic survey measurement data to form error estimates in a magnetic survey system is applied. The error estimates are used to correct magnetic survey data provided by the magnetic survey system. Magnetic only survey data is used when convergence of the error estimates has occurred. Information that facilitates drilling the wellbore is provided to a user based on one of the corrected magnetic survey data and the magnetic only survey data.

The statistical estimation process may be a least squares estimation process, a Kalman filter process or any other applicable process that can be used to provide statistical estimation.

A gyroscopic survey can be determined from the gyroscopic survey measurement data. Magnetometer measurement estimates may be determined from the gyroscopic survey and a plurality of parameters.

The plurality of parameters may be total Earth's field, dip angle, and declination.

The plurality of parameters may be Earth's field correction data. The Earth's field correction data may be determined from the error estimates and the plurality of parameters, which may include total Earth's field, dip angle, and declination. The plurality of parameters for the Earth's field correction data may also include in field referencing (IFR) data.

A comparison of the magnetometer measurement estimates and the magnetic survey measurement data may be provided. The error estimates are determined from the comparison, a sensor noise factor and a magnetic sensor uncertainty factor.

The error estimates can be used to provide corrections to a local geomagnetic model. The local geomagnetic model may be a British Geological Survey Global Geographic model or any other suitable model. In addition, where IFR data is readily available, the local geomagnetic model may include in-field referencing (IFR) data.

Determining when convergence of the error estimates has occurred may include monitoring a covariance of the error estimates and a magnitude of a difference between magnetometer measurements and magnetometer measurement estimates until the covariance and the magnitude values reduce to predefined levels.

Magnetic only survey data can be used for a remainder of the drilling process upon convergence.

Processing the gyroscopic measurement data to form the error estimates may be deactivated upon convergence. Processing the gyroscopic measurement data may be periodically reactivated to determine an accuracy of the magnetic only survey data. Based on the determined accuracy, the magnetic only survey data can continue to be used or new corrected magnetic survey data can be provided until convergence re-occurs.

The corrected magnetic survey data can be used to facilitate drilling the wellbore prior to convergence of the error estimates. The magnetic only survey data can be used to facilitate drilling the wellbore upon convergence of the error estimates. Facilitating drilling of the wellbore may include determining a drilling trajectory.

Described herein are various implementations of a method for correcting a magnetic survey. A statistical estimation process that combines magnetic survey measurement data and post-drilling gyroscopic survey measurement data to determine error estimates in a magnetic survey system is applied. The magnetic survey data can be stored in memory or at surface and is combined with the gyroscopic data using a statistical estimation process that is carried out at surface. The error estimates are used to correct magnetic survey data provided by the magnetic survey system.

The error estimates may be used to provide corrections to a local geomagnetic model. The local geomagnetic model may include in field referencing (IFR) data. Information that facilitates the drilling of additional wellbores in the same area, or further sections of the original wellbore, is provided to a user based on the corrected magnetic survey data.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Disclosed herein are methods of combining gyroscopic and magnetic survey measurements of an oil or gas well in order to enhance the accuracy of the magnetic survey, reduce the need to use expensive techniques for aiding the magnetic survey and to minimize rig time to achieve further savings in the cost of drilling a well.

Figure 1:
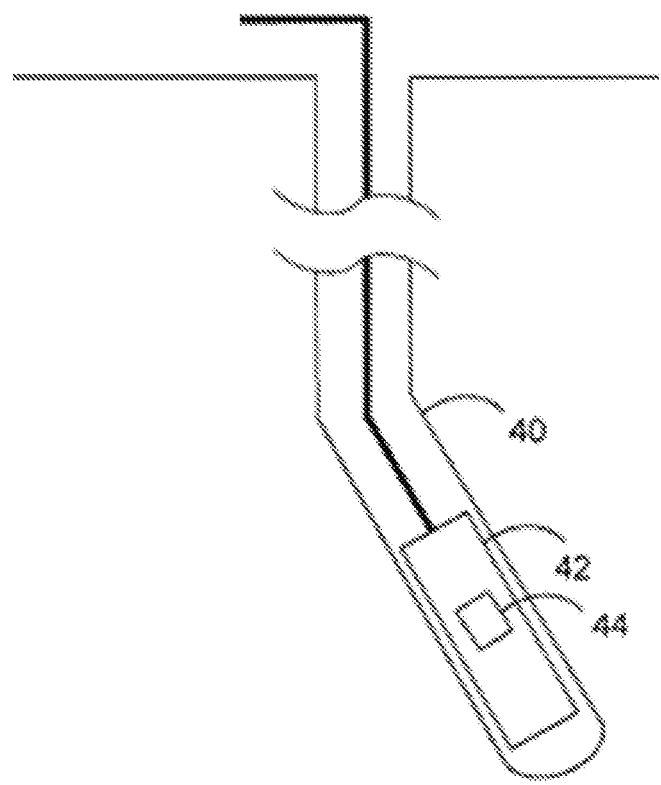
FIG. 1 illustrates a diagram of a downhole tool configured to be inserted into a wellbore being surveyed in accordance with implementations of various techniques described herein.

FIG. 1 illustrates a diagram of a downhole tool 100 configured to be inserted into a wellbore being surveyed. The downhole tool 42 includes one or more sensors 44. Using the downhole tool 42, data collected from at least a section of the wellbore 40 can be used to correct MWD survey data during the drilling process. Processing to correct the MWD survey data may be performed either downhole in a computer installed within the downhole tool 42 or at the surface when data from the MWD and GWD tools are sent to the surface.

In one implementation, communication with the surface may be by mud pulse telemetry or electromagnetic magnetic telemetry (EMT). In another implementation, when the estimation processing is performed downhole (in the computer installed within the downhole tool 42), only the corrected MWD data is sent to the surface.

The methods disclosed herein may use any survey type, e.g., accelerometers, magnetometers, gyroscopes, and combinations thereof. The surveys can include data generated during drilling by sensors 44, which may include a "measurement while drilling" (MWD) sensor system and/or a "gyro while drilling" (GWD) sensor system.

Using high inclination gyro while drilling (GWD) tools, the methods described herein are able to establish a definitive survey in real-time while drilling progresses. In certain implementations, as the number of available data sets increases as drilling progresses, the accuracy to which the current location is known can continue to increase as drilling gets deeper and closer to target. In certain implementations, the GWD sensor(s) can be run at the same time as a magnetic measurement while drilling (MWD) sensor(s).

The combination of multiple surveys through a weighted averaging process can result in enhanced confidence in the resulting survey and a reduction in survey error uncertainty. In the situation where two surveys are combined and one is known to be of significantly greater precision than the other, the higher accuracy survey can be treated as a reference, and measurement differences between the two sets of data can be used to form estimates of the errors in the lower quality survey. These estimates may then be used to correct the lower grade system. This situation can arise, for example, during the process of creating a well using both magnetic measurement while drilling (MWD) and gyroscopic (gyro while drilling (GWD)) survey tools, particularly when using the most basic MWD approach, e.g., in the absence of in-field referencing (IFR) techniques. It is noted that MWD is the most widely and commonly used method for controlling the direction of a well during the drilling process, with GWD being used in regions of suspected magnetic interference.

To date, high precision gyroscopic surveys have been based on the application of mechanical spinning wheel gyroscopic sensors. Such instruments are subject to a variety of error sources, including gravity dependent errors resulting from mass unbalance and other imperfections within the sensor. Careful calibration and on-line correction methods allow such effects to be contained to within acceptable levels. Relatively new sensor technology, such as Coriolis vibratory gyros (CVGs) and micro-electro mechanical sensors (MEMS), have now been developed to achieve a level of performance comparable with the best mechanical gyros used in oilfield applications. Such instruments are far less susceptible to g-dependent effects, making them easier to use without the concern over the effect that g-dependent errors may be having on survey accuracy. It therefore becomes realistic to use a CVG gyro survey as a reference allowing MWD magnetic surveys errors to be estimated and corrected.

Although it may be possible due to the accuracy and reliability of present-day gyro surveys to use gyro surveys alone, there are a number of reasons for incorporating two or more survey tools in a well. One reason for incorporating two survey tools in a well is that such techniques offer the best possible means of survey quality control. Another practical reason for retaining the MWD survey is the reduced time needed to gather survey data using magnetic sensors. The survey tool is stationary while survey data is collected. Surveys can be taken when the bottom hole assembly (BHA) is stationary during the connection (or disconnection) of a section of drill pipe. The use of MWD alone therefore allows a reduction in the duration of these stationary intervals leading to an overall reduction in the rig time needed to construct the well. The financial benefits of adopting this approach are very significant.

Figure 2:
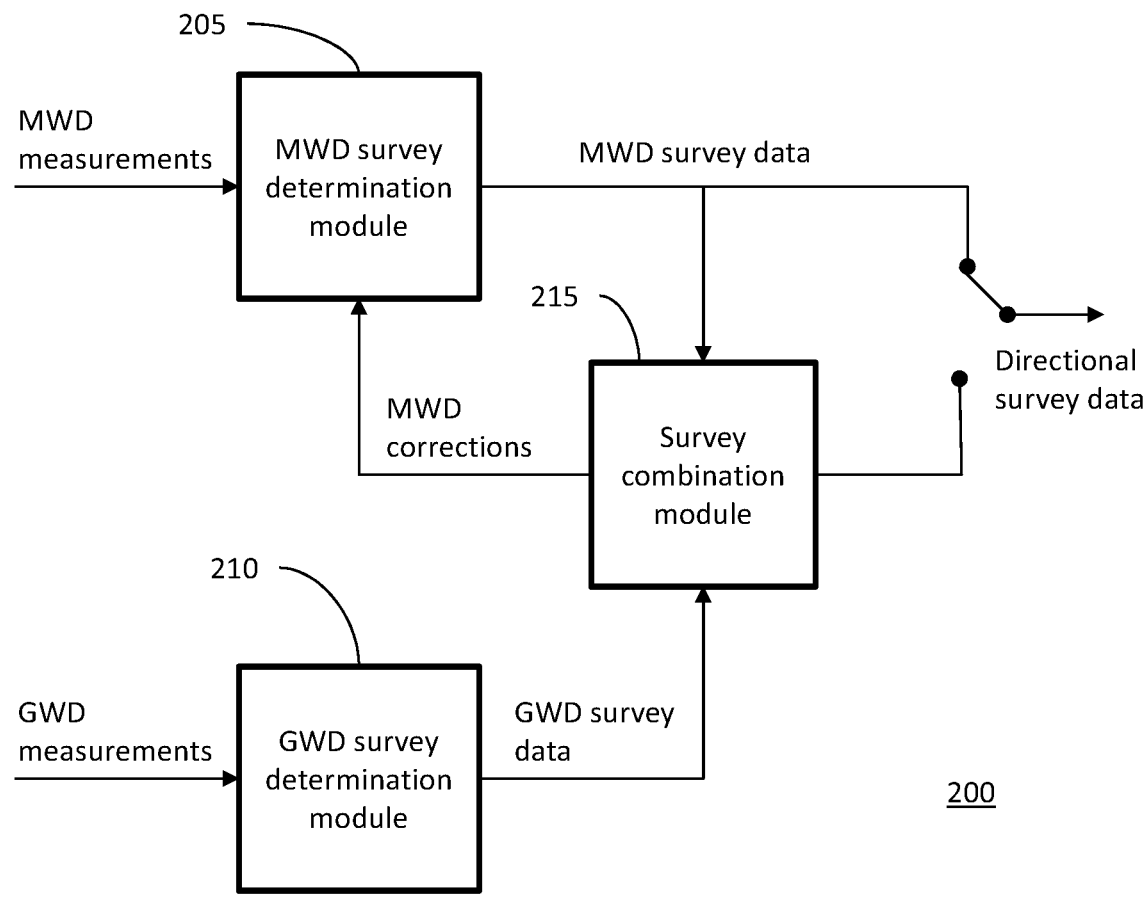
FIG. 2 illustrates a block diagram of a directional survey generation system in accordance with implementations of various techniques described herein.

Disclosed herein is a survey system that utilizes both the gyro and magnetic tools throughout the length of well in real-time while the well is being drilled. At an early stage of the well construction process, the MWD error estimation and correction method is enabled. Subsequent sections of the well can be drilled using MWD alone. This method can be repeated to verify that no changes have occurred and also to meet quality control (QC) redundancy requirements. New MWD runs using freshly replaced tools, i.e., replacement tools, may also follow the same procedure. The application of such a strategy has the added benefit of avoiding the use of IFR, which provides significant cost savings in the well construction. The overall strategy is represented in FIG. 2, which illustrates the option to use either the combined MWD/GWD data (which can provide corrected MWD data) or the MWD data alone (once a determination has been made that the MWD data is accurate) to control the drilling process. The survey data created is transmitted to the surface to allow the directional driller to control the wellbore trajectory and/or used downhole as part of an automated well trajectory control process.

FIG. 2 includes a block diagram of a directional survey generation system 200. Directional survey generation module 200 includes a MWD survey determination module 205, a GWD survey determination module 210, and a survey combination module 215. The MWD survey determination module 205 receives MWD measurements from one or more MWD sensors 44 and the GWD survey determination module 210 receives GWD measurements from one or more GWD sensors 44. The survey combination module 215 receives MWD survey data and GWD survey data and provides MWD correction data to the MWD survey determination module 205. The MWD survey determination module 205 applies the MWD correction data to the MWD measurements to provide the MWD survey data. The directional survey data may include either MWD survey data alone from MWD survey determination module 205 or survey data provided by the survey combination module 215.

Given knowledge of the sources of error, and the manner in which they propagate in the MWD system (based on the published Instrument Performance Model) and assuming proper quality control methods are adhered to and satisfied, the MWD error estimation method disclosed herein may be achieved using statistical estimation techniques such as least squares estimation or Kalman filtering methods. The application and implementation of such statistical estimation methods for enhancing standard MWD surveys is addressed in this disclosure. A top level illustration of this implementation is given in FIG. 3.

Figure 3:
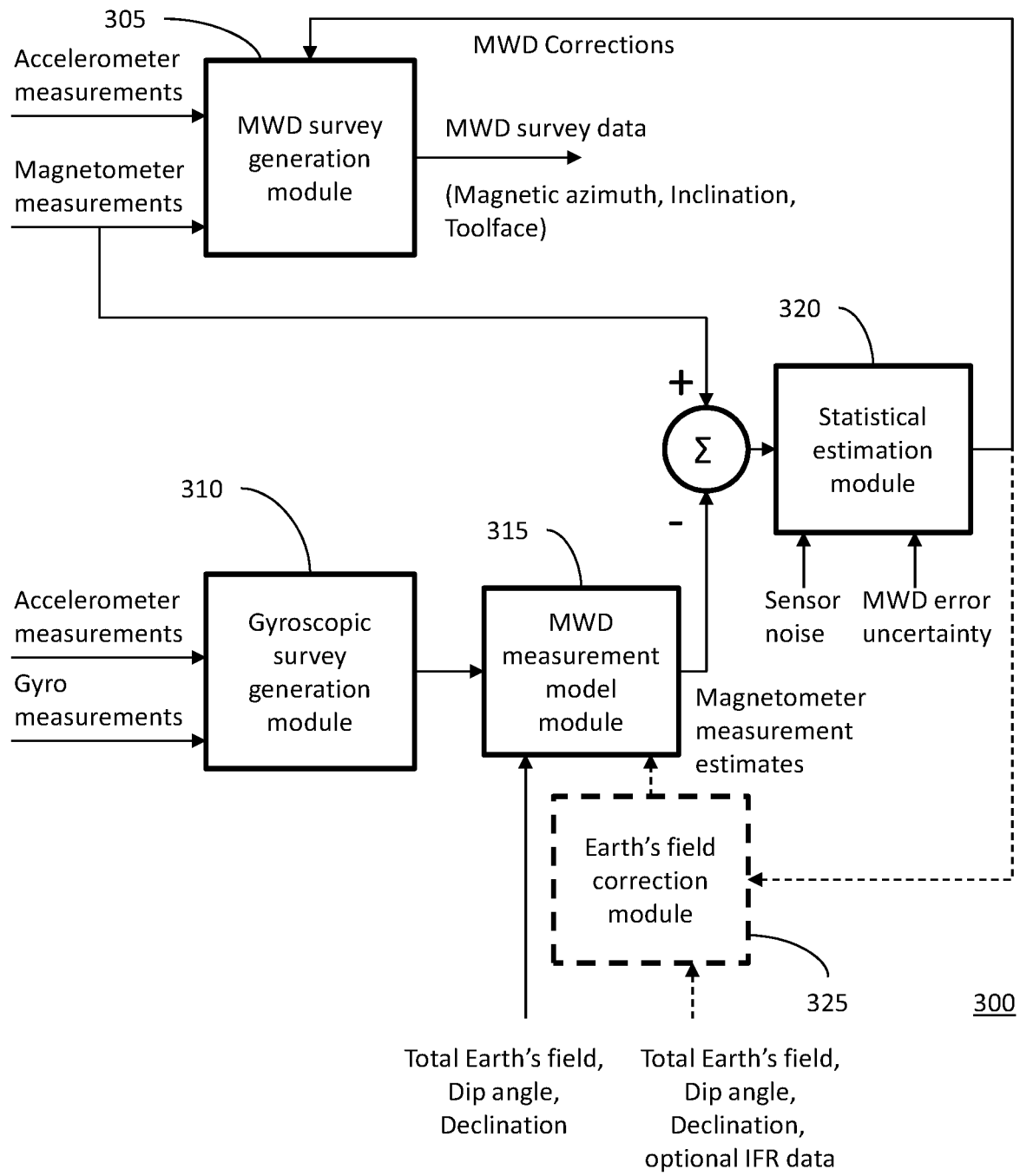
FIG. 3 illustrates a block diagram of a directional survey generation system in accordance with implementations of various techniques described herein.

FIG. 3 includes a block diagram of a directional survey generation system 300. Directional survey generation module 300 includes a MWD survey generation module 305, a gyroscopic survey generation module 310, a MWD measurement model module 315 and a statistical estimation module 320. An optional Earth's field correction module 325 may also be included in directional survey generation module 300. The MWD survey generation module 305 receives accelerometer measurements and magnetometer measurements and provides MWD directional survey data, which may include toolface, inclination and magnetic azimuth data. In this implementation, the gyroscopic survey generation module 310 receives accelerometer measurements and gyro measurements to generate gyroscopic survey data, e.g., toolface, inclination and azimuth with respect to true north, which is towards the geographic North Pole. The MWD measurement model module 315 receives survey data from the gyroscopic survey generation module 310. The MWD measurement model module 315 also receives additional parameters/information, e.g., total Earth's field, dip angle and declination. In an optional implementation, the Earth's field correction module 325 receives the total Earth's field, dip angle and declination data and MWD correction data, and provides corrected Earth's field data to the MWD measurement model module 315. In another implementation, In Field Referencing (IFR) data may also be provided to the Earth's field correction module 325 to provide corrected Earth's field data. The information received by the MWD measurement model module 315 is used to determine magnetometer measurement estimates. These magnetometer measurement estimates are compared to the magnetometer measurements, which were received by the MWD survey calculation module. The comparison information is provided to the statistical estimation module 320, which also factors in sensor noise and MWD error uncertainty to provide MWD corrections to the MWD survey generation module 305. As stated above, when the optional Earth's field correction module 325 is utilized, the statistical estimation module 320 also provides MWD correction data to the Earths field correction module 325.

MWD errors of principle concern which may give rise to azimuth errors are as follows:

Declination error

Axial interference

Magnetometer scale factor error—the effect of magnetic mud

Estimates of these error terms are generated, e.g., using the survey combination module 200 of FIG. 2 or the statistical estimation module 300 of FIG. 3. These estimates are then used to correct the MWD system in subsequent survey calculations. A brief description of these error sources is given below.

Declination error. A gyro system provides estimates of tool/wellbore azimuth or bearing with respect to geographic north (A). A magnetic system provides estimates of tool/wellbore azimuth with respect to magnetic north ($A_m$). The difference in these two estimates is referred to as the declination angle (D) and this quantity is provided or determined in order to allow magnetic survey measurements to be used to compute the location of the well in the geographic coordinate frame; where $A=A_m+D$.

Axial interference. Axial interference is defined as the effect of magnetic material in the tool string above and below the MWD tool leading to an additional magnetic field (over and above the components of the Earth's field which need to be monitored to compute magnetic azimuth) that leads to the erroneous calculation of magnetic azimuth.

Magnetic mud. Magnetic mud is defined as magnetic particles in the fluid surrounding the tool which act to screen the magnetometers, which result in erroneous measurements. These erroneous measurements may appear as a change in the scale factor of the magnetometers that measure the magnetic field components in the lateral direction with respect to the well.

Figure 4:
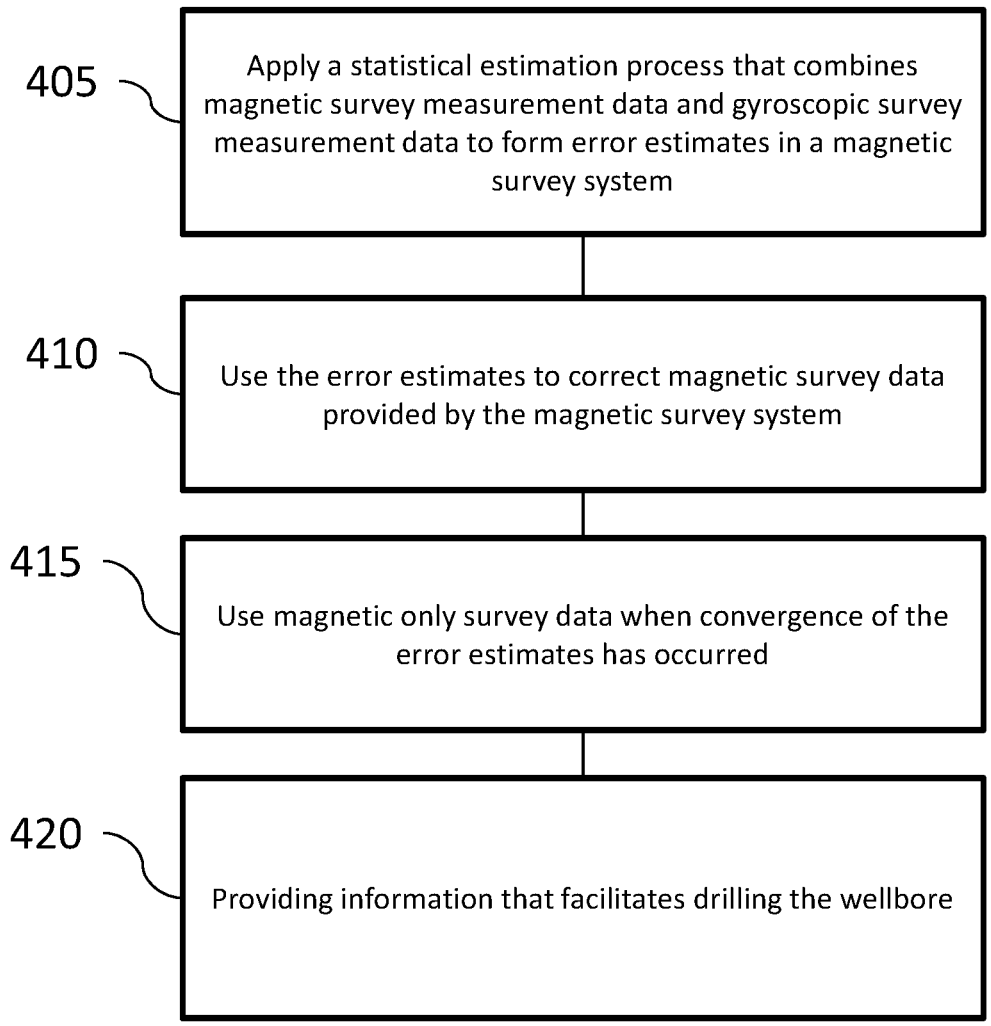
FIG. 4 illustrates a block diagram of a method for combining magnetic and gyroscopic survey measurements in accordance with implementations of various techniques described herein.

FIG. 4 includes a block diagram of a method 400 for surveying a wellbore. At block 405, a statistical estimation process that combines magnetic survey measurement data and gyroscopic survey measurement data to form error estimates in a magnetic survey system is applied. The statistical estimation process may be provided by statistical estimation module 320. The statistical estimation process may be a least squares estimation process, a Kalman filter process or any other applicable process that can be used to provide statistical estimation.

In one implementation, error estimates for both the gyroscopic survey data and the magnetic survey data can be determined using a statistical estimation process. In one implementation, correction of both the gyroscopic and magnetic survey data can be accomplished by using a weighted average.

A gyroscopic survey, e.g., using gyroscopic survey generation module 310, is determined from the gyroscopic survey measurement data. Magnetometer measurement estimates are determined, e.g., using MWD measurement model 315, from the gyroscopic survey and a plurality of parameters.

In one implementation, the plurality of parameters may be total Earth's field, dip angle, and declination.

In another implementation, the plurality of parameters may be Earth's field correction data, e.g., provided by Earth's field correction module 325. The Earth's field correction data may be determined from the error estimates and the plurality of parameters, which include total Earth's field, dip angle, and declination. In one implementation, the plurality of parameters for the Earth's field correction data also includes IFR data.

In one implementation, a comparison of the magnetometer measurement estimates and the magnetic survey measurement data is provided. The error estimates are determined from the comparison, a sensor noise factor and a magnetic sensor uncertainty factor.

At block 410, the error estimates are used to correct magnetic survey data, e.g., by MWD survey generation module 305. In one implementation, the error estimates can be used to provide corrections to a local geomagnetic model. The local geomagnetic model may be a British Geological Survey Global Geographic model or any other suitable model. In addition, where IFR data is readily available, the local geomagnetic model may include in field referencing (IFR) data.

At block 415, magnetic only survey data is used and/or provided, e.g., by MWD survey generation module 305, when convergence of the error estimates has occurred.

In one implementation, determining when convergence of the error estimates has occurred includes monitoring a covariance of the error estimates and a magnitude of a difference between magnetometer measurements and magnetometer measurement estimates until the covariance and the magnitude values reduce to predefined levels.

In one implementation, magnetic only survey data is used for a remainder of the drilling process upon convergence.

In one implementation, processing of the gyroscopic measurement data to form the error estimates is deactivated upon convergence. Processing of the gyroscopic measurement data is periodically reactivated to determine an accuracy of the magnetic only survey data. Based on the determined accuracy, the magnetic only survey data continues to be used or new corrected magnetic survey data is provided until convergence re-occurs.

At block 420, information that facilitates drilling the wellbore is provided. In one implementation, the information is provided to a user, e.g., a directional driller or man-in-the-loop, and is based on one of the corrected magnetic survey or the magnetic only survey.

In another implementation, the information is automatically provided to a drilling system. A drilling trajectory can be automatically modified based on one of the corrected magnetic survey data and the magnetic only survey data.

In one implementation, the corrected magnetic survey data is used to control the drilling process, e.g., facilitate drilling of the wellbore, prior to convergence of the error estimates. The magnetic only survey data is used to control the drilling process upon convergence of the error estimates. In one implementation, providing information that facilitates drilling the wellbore includes determining and/or providing control of a drilling trajectory.

The present method and system for surveying a wellbore provides the location of the well with greater accuracy. This information can be used for future reference or for use in adjusting a trajectory. This information may also be used to more accurately follow a planned or target wellpath, e.g., path of the wellbore. Information may be provided on a location of a well so that changes can be made to the drilling path or trajectory. As mentioned above, changes/adjustments to the drilling path or trajectory based on the information may be implemented by a user or automatically, e.g., via control information generated based on a generated survey and provided to a rotary steerable tool.

The provided information can be used to: provide a record of the trajectory, path and/or location of the well; provide control information; adjust a trajectory of a well path; and/or correct a path of the well. When the generated survey is used to provide a record of the trajectory, path, and/or location of the well, the generated survey can be used to avoid collisions with existing wells.

The following describes one implementation of an example system according to the system shown in FIG. 2. The magnetic and gyroscopic system measurements of azimuth may be compared. Based on knowledge of how the various error sources propagate as survey error, a least squares estimation (LSE) of these errors may be conducted. This is accomplished by collecting survey readings over a number of survey stations, and performing the least squares calculation. In one implementation, the number of survey stations can be 5 or more. The error estimates are then applied as corrections to the MWD survey data as drilling proceeds in the subsequent well section. The effectiveness of the method in calculating the errors correctly is monitored by observing the expected reduction in the azimuth measurement differences, the variances of errors and correlation coefficients, all of which can be generated as part of the least squares process.

This method outlined above may be conducted in an iterative manner by implementing the LSE based on a fixed number of readings before advancing to the next station and repeating the method using the same number of readings. For instance, in one implementation, readings from the new station may be included and readings from the initial station may be removed from the first set of readings. Therefore, having collected the first set of readings to initiate the method, the estimation calculation is repeated at each station thereafter. This approach has the additional advantage of filtering (smoothing) noisy measurements generated by either the magnetic or the gyroscopic survey system.

An alternative implementation of a system according to FIG. 3 may be implemented using different measurement inputs. The magnetometer measurements may be used directly and compared with estimates of the magnetometer measurements that are derived using the gyro measurements and magnetic field data including the current estimate of declination.

The magnetometer readings are denoted $\tilde{b}_x$, $\tilde{b}_y$, $\tilde{b}_z$ and estimates of these quantities ($\hat{b}_x$, $\hat{b}_y$, $\hat{b}_z$) are derived based on knowledge of the total Earth's magnetic field ($b_T$), dip ($\theta$) and declination (D):

$$\hat{b}_x = b_T[\cos\theta \cos(A-D)\cos I - \sin\theta \sin I] \sin TF + b_T \cos\theta \sin(A-D)\cos TF$$

$$\hat{b}_y = b_T[\cos\theta \cos(A-D)\cos I - \sin\theta \sin I] \cos TF - b_T \cos\theta \sin(A-D)\sin TF$$

$$\hat{b}_z = b_T[\cos\theta \cos(A-D)\sin I - \sin\theta \cos I]$$

where A, I and TF represent the true azimuth (derived from the gyro measurements) and the inclination and tool face angles (derived from the accelerometer measurements) respectively.

The least squares estimation process is designed to generate estimates of the declination error, the magnetometer biases and scale factor errors, all of which constitute the error state estimation vector for the purposes of this example mechanisation, and is denoted by $\Delta X$.

The measurement differences, $$\Delta Y = \begin{bmatrix} \hat{b}_x - \tilde{b}_x \\ \hat{b}_y - \tilde{b}_y \\ \hat{b}_z - \tilde{b}_z \end{bmatrix}$$

form inputs to the least squares estimator, and is based on a measurement error model which may expressed in terms of the following matrix equation: $\Delta Y = H \Delta X$, where H relates the measurement differences to the error states, referred to as the design matrix, and is formed from the partial derivatives of the measurement equation.

The least squares estimates of the error states are generated using:

$$\Delta X = [H^T H]^{-1} H^T \Delta Y$$

The covariance of the error estimates (P), which can be monitored to check that the estimation process converges over successive iterations, is formed as follows:

$$P = \sigma_0^2 [H^T H]^{-1} \text{ where}$$

$$\sigma_0^2 = \frac{[A\hat{\Delta}\hat{X} - \Delta Y]^T \cdot [A\hat{\Delta}\hat{X} - \Delta Y]}{m - s}$$

in which m=number of measurements, s=number of states. $\widehat{\Delta X}$ is the best estimate of the errors.

Figure 5:
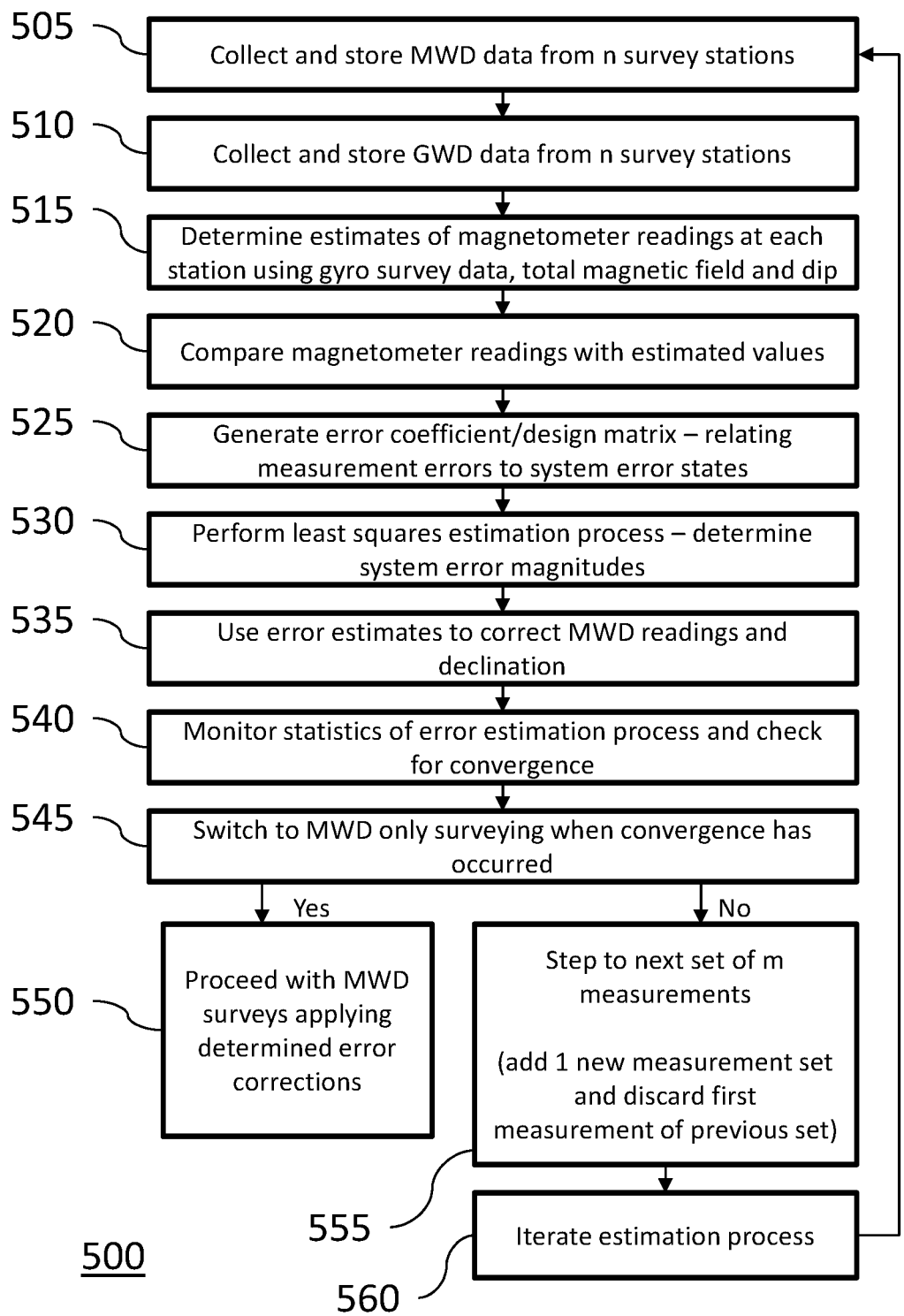
FIG. 5 illustrates a block diagram of a method for combining magnetic and gyroscopic survey measurements in accordance with implementations of various techniques described herein.

The LSE method outlined above is illustrated in FIG. 5. FIG. 5 illustrates a block diagram of a method 500 for combining magnetic and gyroscopic survey measurements. MWD data is collected and stored from n survey stations at block 505. At block 510, GWD data is collected and stored from n survey stations. Estimates of magnetometer readings are determined at each station using gyro survey data, total magnetic field and dip at block 515. Magnetometer readings are compared with estimated values at block 520. At block 525, an error coefficient/design matrix is generated to relate measurement errors to error states defined above. At block 530, a least squares estimation process is performed to determine system error magnitudes. At block 535, error estimates are used to correct MWD readings and Earth's magnetic field parameters including declination and dip angles. The statistics of the error estimation process are monitored and checked for convergence at block 540. At block 545, the system, e.g., system 200, 300, switches to MWD only surveying when convergence has occurred. If convergence has not occurred, the method proceeds to the next set of m measurements using an iterative process at blocks 555, 560. In one implementation, after a certain number of data sets is collected, when a new measurement set is collected, the first measurement of the previous set of data is discarded. Once convergence has been determined to have occurred at block 545, MWD surveys alone, with the previously determined error corrections applied, are used to control the subsequent path of the well as drilling continues at block 550.

An iterative estimation process based on a Kalman filtering method offers a further alternative approach, which is described in more detail in the paragraphs below. In this case, each set of survey readings are processed in turn as drilling proceeds and the current estimates of the errors are used to correct the MWD readings.

The measurement differences ($\Delta Y$) described above form the inputs to the Kalman filter, which again is based on an error model of the system, defined by the design matrix H, which is often referred to as the measurement matrix in the context of Kalman filtering. The expected errors in the error states ($\Delta X$) are used to initialize an error covariance matrix (P), which is used within the filter to apportion the measurement differences between the respective error estimates and the expected levels of measurement noise.

The Kalman filter may be implemented in two stages in accordance with standard procedure. At each survey station, a prediction step takes place followed by a measurement update step in which the latest set of measurements are incorporated into the calculation in order to update the error estimates. The filter equations are given below.

The covariance matrix corresponding to the uncertainty in the predicted state vector in certain implementations is given by:

$$P_{k/k-1} = P_{k-1/k-1} + Q$$

where $P_{k/k-1}$ is the covariance matrix at station k predicted at station k−1, e.g., the covariance matrix prior to the update using the magnetometer measurements at station k. Since there are no dynamics associated with the error terms considered here, the prediction step simply involves an update to the error covariance matrix through the addition of a noise term which represents the expected random uncertainty in the error terms.

In certain implementations, the covariance matrix and the state vector are updated, following a measurement at station k, using the following equations:

$$P_{k/k} = P_{k/k-1} - G_k H_k P_{k/k-1}$$

and $$X_{k/k} = X_{k/k-1} - G_k \Delta Y_k$$

where $P_{k/k}$ is the covariance matrix following the measurement update at station k, $X_{k/k-1}$ is the predicted state vector, and $X_{k/k}$ is the state vector following the measurement update. The gain matrix $G_k$ is given by:

$$G_k = P_{k/k-1} H_k^T [H_k P_{k/k-1} H_k^T + R_k]^{-1}$$

where $R_k$ represents the noise in the measurement differences.

Figure 6:
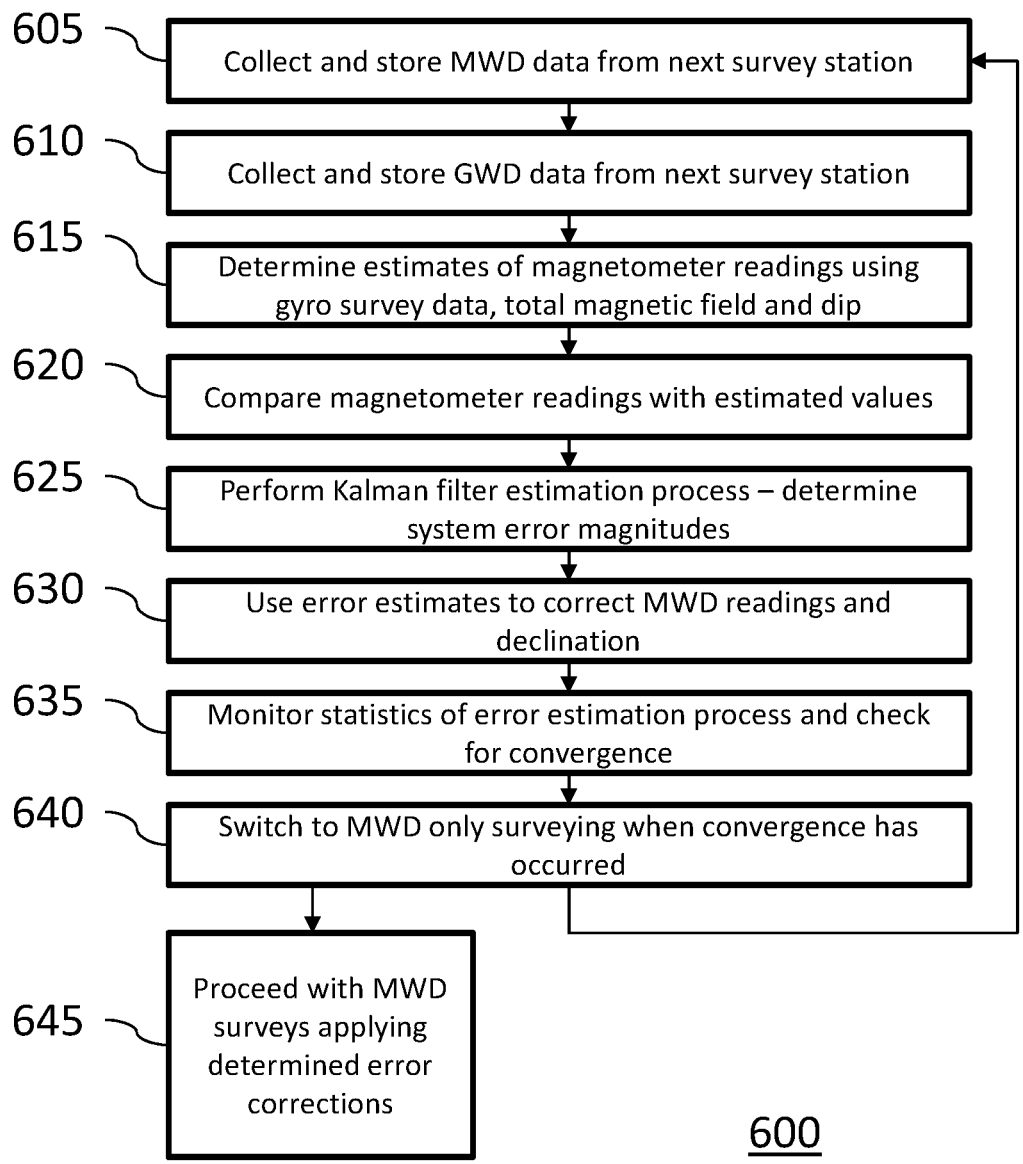
FIG. 6 illustrates a block diagram of a method for combining magnetic and gyroscopic survey measurements in accordance with implementations of various techniques described herein.

The Kalman filtering method outlined here is illustrated in FIG. 6. FIG. 6 illustrates a block diagram of a method 600 for combining magnetic and gyroscopic survey measurements. At block 605, MWD data is collected and stored from a survey station. GWD data is collected and stored from the survey station at block 610. At block 615, estimates of magnetometer readings are determined using gyro survey data, total magnetic field and dip. The magnetometer readings are compared with the estimated values at block 620. A Kalman filter estimation process is performed to determine system error magnitudes at block 625. At block 630, error estimates are used to correct MWD readings and declination. At block 635, statistics of the error estimation process are monitored and checked for convergence. The method proceeds iteratively until convergence occurs. At block 645, once filter convergence has occurred, MWD surveys alone, with the previously determined error corrections applied, are used to control the subsequent path of the well as drilling continues. The system, e.g., system 200, 300, switches to MWD only surveying when convergence has occurred.

In either case, least squares or Kalman estimation, the estimation method is continued until the error estimates are deemed to have converged. When convergence occurs, it becomes safe, at this point, to switch to MWD only surveys. Convergence is assessed by monitoring the covariance of the estimated errors and the magnitude of the measurement differences until these values reduce to predefined levels which are known to be consistent with an acceptable level of survey accuracy. The square roots of the diagonal elements of the covariance matrix, which correspond to the estimated standard deviations of the estimated states, may be monitored for this purpose. Convergence of the estimation process may be deemed to have occurred when the declination and dip values have been reduced to less than 0.1 degree, the magnetometer biases and axial interference to 10-20 nanoTesla or less and scale factor errors to less than 0.1 percent. The success of the method in generating separate estimates of the individual errors will depend to some extent on wellbore geometry and the rotation of the survey tools within the well. By monitoring the normalized covariance parameters, performance may be considered acceptable provided the off-diagonal elements of this matrix are less than 0.4.

In one implementation, magnetic only survey data, is used for a remainder of a drilling process upon convergence.

In one implementation, the system stops processing the gyroscopic measurement data upon convergence. Processing of the gyroscopic measurement data can be periodically reactivated to determine an accuracy of the magnetic only survey data. Based on the determined accuracy, the magnetic only survey data continues to be used or new corrected magnetic survey data is provided until convergence re-occurs.

It is emphasized that the methods proposed herein are implemented in a downhole processor in real-time as part of the well construction process. The methods proposed herein may also be implemented at the surface for wireline operated tools, and memory operated tools like drop tools and slickline conveyed tools as part of a post drilling survey correction process.

Figure 7:
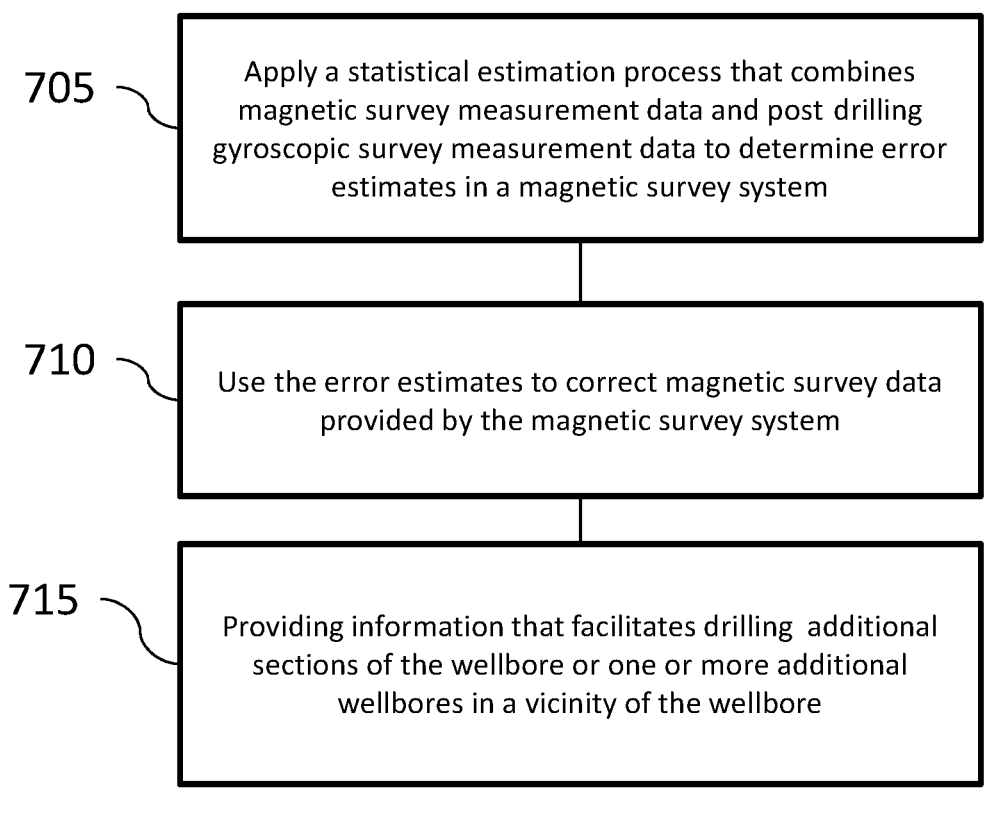
FIG. 7 illustrates a block diagram of a method for correcting a magnetic survey in accordance with implementations of various techniques described herein.

FIG. 7 includes a block diagram of a method 700 for correcting a magnetic survey. At block 705, a statistical estimation process that combines magnetic survey measurement data, stored at surface after drilling is complete, and post-drilling gyroscopic survey measurement data to determine error estimates in a magnetic survey system is applied. The statistical estimation process may be provided by statistical estimation module 320. The statistical estimation process may be a least squares estimation process, a Kalman filter process or any other applicable process that can be used to provide statistical estimation.

In one implementation, error estimates for the magnetic survey data can be determined using a statistical estimation process.

A gyroscopic survey, e.g., using gyroscopic survey generation module 310, is determined from the gyroscopic survey measurement data. Magnetometer measurement estimates are determined, e.g., using MWD measurement model 315, from the gyroscopic survey and a plurality of parameters. In this implementation, the gyroscopic survey generation module 310 may be implemented at the surface using wireline operated tools and memory operated tools like drop tools and slickline conveyed tools.

The gyroscopic and accelerometer measurements generated by a gyro survey tool may be processed either downhole or at the surface to generate the gyroscopic survey, i.e. the azimuth, inclination and toolface data, calculated at each survey station/depth.

The gyroscopic survey may be sent directly to the surface for a tool operating on an electric wireline. For drop and slickline tools, the gyroscopic survey can be retrieved when the tool itself is recovered at surface.

On completion of the post-drilling gyroscopic survey, both a magnetic survey and a gyroscopic survey of a completed well, or well section, can be stored at the surface.

In one implementation, the plurality of parameters may be total Earth's field, dip angle, and declination.

In another implementation, the plurality of parameters may be Earth's field correction data, e.g., provided by Earth's field correction module 325. The Earth's field correction data may be determined from the error estimates and the plurality of parameters, which include total Earth's field, dip angle, and declination. In one implementation, the plurality of parameters for the Earth's field correction data also includes IFR data.

In one implementation, a comparison of the magnetometer measurement estimates and the magnetic survey measurement data is provided. The error estimates are determined from the comparison, a sensor noise factor and a magnetic sensor uncertainty factor.

The stored gyroscopic survey data may be combined with the stored magnetic survey data and processed at surface using the statistical estimation process, e.g., statistical estimation module 320, to generate estimates of the errors in the magnetic system. In particular, estimates of the errors in the Earth's magnetic field data (total field, declination and dip) are generated. At block 710, the error estimates of the Earth's magnetic field data are used to correct the magnetic survey data. A corrected magnetic survey of the well can be obtained, e.g., from survey generation module 305. In one implementation, the error estimates can be used to provide corrections to a local geomagnetic model. The local geomagnetic model may be a British Geological Survey Global Geographic model or any other suitable model. In addition, where IFR data is readily available, the local geomagnetic model may include in field referencing (IFR) data.

At block 715, information that facilitates drilling the wellbore is provided. In one implementation, the information is provided to a user, e.g., a directional driller or man-in-the-loop, and is based on the corrected magnetic survey.

In one implementation, the information is automatically provided to a drilling system.

In one implementation, the corrected magnetic field data may be used subsequently for magnetic/MWD surveys to either: drill additional sections of the same well; or drill other wells in close proximity to the original well.

In one implementation, the corrected magnetic survey data is used to control the drilling process, e.g., facilitate drilling of the wellbore. In one implementation, providing information that facilitates drilling the wellbore includes determining and/or providing control of a drilling trajectory.

The present method and system for surveying a wellbore provides the location of the well with greater accuracy. This information can be used for future reference or for use in adjusting a trajectory. This information may also be used to more accurately follow a planned or target wellpath, e.g., path of the wellbore. Information may be provided on a location of a well so that changes can be made to the drilling path or trajectory. As mentioned above, changes/adjustments to the drilling path or trajectory based on the information may be implemented by a user or automatically, e.g., via control information generated based on a generated survey and provided to a rotary steerable tool.

The provided information can be used to: provide a record of the trajectory, path and/or location of the well; provide control information; adjust a trajectory of a well path; and/or correct a path of the well. When the generated survey is used to provide a record of the trajectory, path, and/or location of the well, the generated survey can be used to avoid collisions with existing wells.

Figure 8:
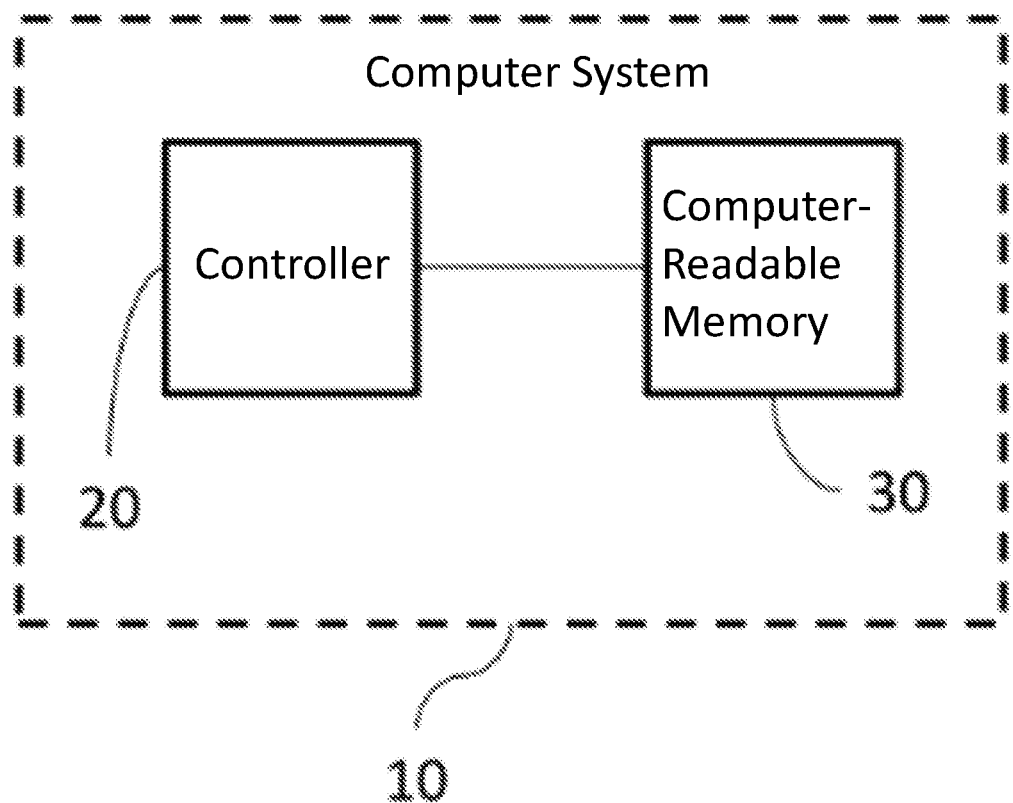
FIG. 8 illustrates an example computer system in accordance with implementations of various techniques described herein.

FIG. 8 schematically illustrates an example computer system 10 in accordance with certain implementations described herein. The computer system 10 can comprise a controller 20 (e.g., one or more processors or microprocessors) in operable communication with at least one computer-readable memory 30 configured to store data and to store software modules that include instructions that are executable by the controller 20. In certain implementations, the computer system 10 comprises a bus (not shown) operative to transfer data between portions of the computer system 10 (e.g., between the controller 20 and the at least one computer-readable memory 30).

The computer system 10 is operative to correct magnetic MWD survey data during the drilling process. Computer system 10 may be part of downhole tool 42 or located at the surface.

The data can comprise some or all of the sensor measurements generated by the one or more sensors 44 of the at least one downhole tool 42 (e.g., sensor measurements indicative of locations of the one or more sensors 44 within the wellbore 40 as a function of position along the wellbore 40). The at least one computer-readable memory 30 can be in any of several forms. For example, in certain implementations, the at least one computer-readable memory 30 comprises read-only memory, dynamic random-access memory, flash memory, hard disk drive, compact disk, and/or digital video disk.

The computer system 10 can comprise hardware, software, or a combination of both hardware and software. In certain implementations, the computer system 10 comprises a standard personal computer or microcontroller. In certain implementations, the computer system 10 is distributed among multiple computers.

The computer system 10 can comprise standard communication components (e.g., keyboard, mouse, toggle switches) for receiving user input, and can comprise standard communication components (e.g., image display screen, alphanumeric meters, printers) for displaying and/or recording operation parameters, casing orientation and/or location coordinates, or other information relating to the wellbore 40, the at least one downhole tool 42, and/or the one or more sensors 44.

In certain implementations, a computer-readable storage medium is provided that has stored thereon a computer program that instructs a computer system to generate a survey of a wellbore section. The computer-readable storage medium can be in any of several forms. For example, in certain implementations, the computer-readable storage medium is tangible and comprises read-only memory, dynamic random-access memory, flash memory, hard disk drive, compact disk, and/or digital video disk. The computer-readable storage medium has computer-executable components or modules, executed on a computer system having at least one computing device. The computer system on which the computer-executable components are executed can be any of the computer systems described above with respect to other implementations.

In some implementations, the data that forms the input to each step of the estimation process, e.g., least squares estimation or Kalman filtering, corresponds to the same well depth. This may be relevant when drilling a high dog-leg section of well.

In accordance with current drilling practice, where both a magnetic MWD tool and a gyro while drilling (GWD) tool are employed, the two systems would be physically installed some distance apart in the drill string (typically 30-60 feet). Clearly, in this situation, the calculated magnetic azimuth derived from the gyro readings, along with the current best estimate of declination, will not correspond accurately to the azimuth of the well at the magnetic sensor location in a curved well. As a consequence of this, the estimates of the magnetometer readings will be in error as a result of the well curvature and the resulting estimates of declination, axial interference, etc., will be degraded. In one implementation, this difficulty can be overcome by interpolating gyro readings taken above and below the locations of each magnetometer reading. This difficulty may also be overcome by predicting ahead to the next magnetic survey station using estimates of the well curvature based on previous successive readings.

Alternatively, this issue can further be overcome by providing a new survey tool. This new survey tool mounts the magnetic and gyroscopic sensors, along with the accelerometers, in a single sensor package where the spacing between the respective sensors is not significant. This new survey tool provides a combined magnetic and gyro measurement package.

Magnetic directional surveys use measurements of the Earth's field derived from sensors in the survey tool to establish the orientation of the tool with respect to the directional reference defined by the Earth's magnetic field vector. The accuracy of magnetic surveys is compromised as a result of variations and local distortions in the reference magnetic field. These variations and local distortions may include:

secular variations resulting from long term changes within the Earth's magnetic core;
diurnal variations caused by solar wind and Earth rotation;
crustal variations owing to deep, magnetic basement rock giving rise to local variation, or other anomalies, in the ambient field.

The MWD quality can be improved through various techniques designed to reduce one or more of these distortions. The effects of secular variations can for example be corrected by the use of the British Geological Survey model of the Earth's field. This model is also known as the British Geological Survey Global Geographic (BGGM) model. The effects of diurnal variations can be reduced by local monitoring of the time-dependent changes in the magnetic field, and the crustal variation through a pre-mapping of surface anomalies. There exists a number of different methods, and naming conventions for correcting secular variations and reducing diurnal and crustal variations. For example, in-field referencing (IFR) is sometimes used in connection with MWD corrections based on local monitoring only, and sometimes in connection with corrections based on all three types, i.e., secular, diurnal and crustal.

The methods disclosed in this application facilitate the correction of important parameters, such as declination and dip angle, as defined by whatever model of the local geomagnetic field is available at the time of drilling, e.g., the local geomagnetic model. This model may include IFR data. As described above, through the application of the combined gyroscopic and magnetic surveying methods disclosed herein, the use of IFR techniques may be avoided altogether with consequent cost savings in the execution of the magnetic surveying process. However, in one implementation, a further option exists where IFR data are available at the drilling site. In this situation, the estimates of the errors in the local Earth's field parameters provided by the statistical estimation processes described here may be used to confirm or to correct the IFR data for subsequent survey operations.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for surveying a wellbore, comprising:
   applying a statistical estimation process that combines magnetic survey measurement data acquired during drilling and gyroscopic survey measurement data acquired after the drilling is complete to determine error estimates in a magnetic survey system;
   using the error estimates to correct magnetic survey data provided by the magnetic survey system; and
   drilling the wellbore based on the corrected magnetic survey data;
   wherein the statistical estimation process is a least squares estimation process or a Kalman filter process.

2. The method of claim 1, further comprising determining a gyroscopic survey from the gyroscopic survey measurement data.

3. The method of claim 2, further comprising determining magnetometer measurement estimates from the gyroscopic survey and a plurality of parameters.

4. The method of claim 3, further comprising comparing the magnetometer measurement estimates and the magnetic survey measurement data.

5. The method of claim 4, wherein the error estimates are determined from the comparison, a sensor noise factor and a magnetic sensor uncertainty factor.

6. The method of claim 3, wherein the plurality of parameters comprise total Earth's field, dip angle and declination.

7. The method of claim 3, wherein the magnetometer measurement estimates are determined from the gyroscopic survey, the plurality of parameters, and Earth's field correction data.

8. The method of claim 1, wherein the magnetic survey measurement data is acquired using a downhole tool having a measurement while drilling (MWD) sensor system, and wherein the gyroscopic survey measurement data is acquired using a wireline operated tool, a drop tool, or a slickline conveyed tool.

9. The method of claim 1, wherein:
the magnetic survey measurement data is stored at the surface after the drilling is complete;
the gyroscopic survey measurement data is stored at the surface after completion of a gyroscopic survey; and
applying the statistical estimation process comprises applying the statistical estimation process at the surface using the stored magnetic survey measurement data and the stored gyroscopic survey measurement data.

10. A method for surveying a wellbore, comprising:
applying a statistical estimation process that combines magnetic survey measurement data acquired during drilling and gyroscopic survey measurement data acquired after the drilling is complete to determine error estimates in a magnetic survey system;
using the error estimates to correct magnetic survey data provided by the magnetic survey system;
determining a gyroscopic survey from the gyroscopic survey measurement data;
determining magnetometer measurement estimates from the gyroscopic survey and a plurality of parameters; and
drilling the wellbore based on the corrected magnetic survey data;
wherein the magnetometer measurement estimates are determined from the gyroscopic survey, the plurality of parameters, and Earth's field correction data;
wherein the Earth's field correction data is determined from the error estimates and the plurality of parameters.

11. The method of claim 10, wherein the plurality of parameters comprise total Earth's field, dip angle and declination.

12. The method of claim 11, wherein the plurality of parameters further comprise in field referencing (IFR) data.

13. A method for surveying a wellbore, comprising:
applying a statistical estimation process that combines magnetic survey measurement data acquired during drilling and gyroscopic survey measurement data acquired after the drilling is complete to determine error estimates in a magnetic survey system;
using the error estimates to correct magnetic survey data provided by the magnetic survey system; and
drilling the wellbore based on the corrected magnetic survey data;
wherein the error estimates are used to provide corrections to a local geomagnetic model.

14. The method of claim 13, wherein the local geomagnetic model comprises a British Geological Survey Global Geographic model.

15. The method of claim 14, wherein the local geomagnetic model includes in field referencing (IFR) data.

16. A method for surveying a wellbore, comprising:
applying a statistical estimation process that combines magnetic survey measurement data acquired during drilling and gyroscopic survey measurement data acquired after the drilling is complete to form error estimates in a magnetic survey system;
using the error estimates to correct magnetic survey data provided by the magnetic survey system; and
modifying a drilling trajectory based on the corrected magnetic survey data;
wherein the statistical estimation process is a least squares estimation process or a Kalman filter process.

17. A method for correcting a magnetic survey, comprising:
applying a statistical estimation process that combines magnetic survey measurement data acquired during drilling and post-drilling gyroscopic survey measurement data to determine error estimates in a magnetic survey system;
using the error estimates to correct magnetic survey data provided by the magnetic survey system; and
based on the corrected magnetic survey data, drilling:
further sections of the wellbore; or
one or more additional wellbores in a vicinity of the wellbore;
wherein the statistical estimation process is a least squares estimation process or a Kalman filter process.

18. A method for correcting a magnetic survey, comprising:
applying a statistical estimation process that combines magnetic survey measurement data and post-drilling gyroscopic survey measurement data to determine error estimates in a magnetic survey system;
using the error estimates to correct magnetic survey data provided by the magnetic survey system; and
based on the corrected magnetic survey data, drilling:
further sections of the wellbore; or
one or more additional wellbores in a vicinity of the wellbore;
wherein the error estimates are used to provide corrections to a local geomagnetic model.

19. The method of claim 18, wherein the local geomagnetic model includes in field referencing (IFR) data.

* * * * *